UNITED STATES PATENT OFFICE.

JOHN F. MARTIN, OF CHICAGO, ILLINOIS, ASSIGNOR OF ONE-HALF TO HORATIO KEELER AND THEODORE P. BAILEY, BOTH OF SAME PLACE.

COMPOUND FOR COATING IRON, WOOD, CANVAS, &c.

SPECIFICATION forming part of Letters Patent No. 377,081, dated January 31, 1888.

Application filed February 2, 1886. Renewed May 27, 1887. Serial No. 239,562. (Specimens.)

*To all whom it may concern:*

Be it known that I, JOHN F. MARTIN, a citizen of the United States, residing in Chicago, county of Cook, and State of Illinois, have invented certain new and useful Improvements in Coating Compounds, of which the following is a specification.

This invention relates to a novel compound or composition of matter which I have found to be of special and marked utility in coating iron, wood, canvas, and the like to imitate marble slabs, oil-cloth, wall-papers, &c., and in addition to this may be used as a glue for uniting woods, &c., together.

The object of this invention is to produce a compound consisting of a homogeneous body having various colors, which, when poured on to form a coating for iron, wood, canvas, and the like materials, shall produce a smooth concrete surface having various designs of color and configuration.

Another object is to produce a compound which, when poured or laid on iron, wood, &c., in a liquid state, will soon harden and become susceptible of a high degree of polish and finish without diminishing its tenacity or color, whereby imitations of marble, oil-cloths, and wall-papers may be produced at small cost.

A further object is to produce a compound which, when applied to any other than a polished and non-porous surface, will adhere thereto and form a coating thereon so closely as to be immovable without damage to the coating or the body to which it adheres, whereby, in addition to its use as a coating, the compound may be utilized as a glue for uniting wood, iron, and other substances.

I attain these objects by the peculiar combination and mixture of water, sulphur, paris-white, zinc-white, shellac, and such other substances as may be desired, all as set forth and explained in the following specification and formula.

First, take a given portion of sulphur—say a quarter of a pound—and place the same in a jar or other suitable vessel, together with any slow-burning substance, or ignite the sulphur itself, and then place the vessel in an air-tight box or compartment in which is contained a vessel holding about one gallon of water, and after setting fire to the material in the jar the box is closed up for two or three hours, when the vessel of water is removed, and will be found to be thoroughly impregnated with the fumes of the sulphur, which it holds in solution. This water is the means I employ for liquefying and softening all the other materials used in the compound, and for convenience of expression and explanation I have denominated this water as "sulphureted water," and shall so denominate it throughout the specification and formula. The next step is to place a given quantity of common glue—say one pound—in a suitable vessel and pour over it just sufficient of this sulphureted water to cover the glue, and after this has been allowed to stand for six or eight hours it is dissolved by heat in the usual manner. I then take a given quantity of paris-white—say about four pounds—and zinc-white, in the proportion of one-tenth of the latter to nine-tenths of the former, mix them thoroughly together in a dry state, and moisten or soften the mixture with sufficient of the sulphureted water to relieve the mixture of all dry lumps, after which I pour into this last mixture sufficient of the glue mixture before described to reduce the whole to the consistency of common sirup, and then thoroughly unite and mix the entire mass by subjecting it to a slow heat for about one hour. Finally, I take a given quantity of dissolved shellac, about a half-pint, and mix the same in a given quantity of zinc-white, about one pound thereof, first moistening the zinc-white with a mixture of sulphureted water and alcohol in the proportion of four to one. This last mixture, consisting of the shellac, zinc-white, sulphureted water, and alcohol, is then mixed with the glue or body mixture, composed of glue, sulphureted water, paris-white, and zinc-white, in proportion of one pint of the shellac mixture to ten pounds of the glue or body mixture, and the whole mass thoroughly united and combined by being subjected to heat for about thirty minutes, thereby producing a homogeneous mass in a liquid state ready to be poured upon any surface on which it is designed to form a coating, or to which it is desired to unite another body.

This compound in its present state is of a whitish or slightly cream color, and may be utilized to a very great advantage as a glue, especially in connection with cabinet-making, possessing great tenacity and adhesiveness, far in excess of that of the finest quality of the ordinary glue, and is rendered even more valuable in that connection, owing to the fact that when prepared as a commercial commodity it may be reduced to the form of powder, and from that condition be converted into a glue or cement ready for use in less than fifteen minutes, which is utterly impossible with glue as heretofore made, for it requires several hours for its preparation.

This compound will also be found of great utility and value in the cementing or uniting together of broken crockery and the like, in consequence of its great tenacity and exceeding hardness when firmly set, for, as a matter of fact, the composition has many of the characteristics of crockery-ware and iron without the brittleness of the former or the objectionable tendency to oxidation of the latter.

In order to produce compounds of varying hues or tints, or rather to give to the body mixture any desired tint, I take a sufficient quantity of any mineral paint—such as Venetian red, chrome-yellow, chrome-green, drop-black, and the like—and first moisten the dry material with the sulphureted water, and then reduce the whole to the consistency of common sirup by mixing in a sufficient quantity of the glue or body mixture, as last described—that is, the composition in its completed state—until the whole mass assumes the desired hue or tint.

In order to coat or cover any surface, especially if desired to be in imitation of marble, I take a sufficient quantity of any one color of the tinted body mixture that I desire to use as a body or background for the marble and stir into it a few drops or small quantity of any one or more of the other colored mixtures, and then pour the whole over the surface to be covered. When sufficiently dried and set, the surface will be found smooth and even, ready for sandpapering or polishing in the usual way; but the particular mechanical means for producing imitations of marble, granite, oil-cloths, wall-paper, and such like materials by the employment of this and other similar compounds I have reserved for another application to be executed and filed of even date herewith, and I therefore will not enter very closely into the details of the manipulation and the results to be obtained therefrom of this compound.

When the coating of the compound has set, as just described, it will be found that although the other color or colors mix with the main body they will appear upon the surface of the same in the shape of veins or clouds. And right here comes one of the greatest peculiarities of my compound, for while the original body mixture will readily absorb the mineral colors when mixed with it, and thereby become a homogeneous mass of any desired color or tint, still when two parts of the compound or parts of the compound in two or more colors are mixed together, no matter in what proportions, the tints cannot be made to blend so as to produce a neutral or combination tint. Hence when small quantities of one or more colors are mixed with a large quantity of any one color, when poured upon a surface to form a coating or cover, the main surface will appear of the general hue of the body color used in the greatest quantity, while the other colors will appear on but incorporated with this body color in the form of veins or clouds. Hence one totally unskilled in the art of painting or the use of colors may readily and easily produce the most startling and accurate imitations of all the most beautiful marbles known to commerce, and at a cost entirely disproportionate to the value of the product.

By the employment of this compound a slab of iron, wood, or other suitable material may be readily marbleized so as to represent any kind of marketable marble, and in any design, shape, or contour that may be desirable.

In cementing crockery and other ware in any colors the tinted compound may be used of a corresponding color, in order as much as possible to conceal the lines of the crack where the mend has been made.

Owing to its imperviousness to moisture, this compound will be found invaluable for coating moldings and tiles for houses, fence-posts, barrels for containing liquids, and a great variety of other articles constantly exposed to the action of moisture. So, also, can this compound be used for producing imitations of wall-paper, oil-cloth, or similar articles in any variety of color and design.

In conclusion, I may add that I do not confine myself to the use of all the ingredients in the condition or proportion herein enumerated, for in cases where the discoloration of the compound is of no consequence, instead of using sulphureted water or sulphur in solution, I may use the sulphur in the form of a powder or flour. Also, where the waterproofing qualities of the compound are not essential, the shellac may be omitted, and as the alcohol is only used for the purpose of more thoroughly incorporating the shellac in the compound the alcohol may also be omitted when desired. Hence it will be seen that the ingredients above enumerated may not only be dispensed with or the proportions changed, but substitutes might be employed in place of the other ingredients without materially changing the nature of my compound or departing from the spirit of my invention.

Having described my invention, what I claim, and desire to secure by Letters Patent, is—

1. A coating compound consisting of a base or body composed of common glue, sulphur, paris-white, and zinc-white, compounded substantially as and for the purpose set forth.

2. A coating compound consisting of a base or body composed of common glue, sulphureted water or sulphur in solution, paris-white, and zinc-white, compounded substantially as and for the purpose set forth.

3. A coating compound consisting of a base or body composed of common glue, sulphur, paris-white and zinc-white, and shellac, compounded substantially as and for the purpose set forth.

4. A coating compound consisting of a base or body composed of common glue, sulphur, paris-white, zinc-white, shellac, and alcohol, compounded substantially as and for the purpose set forth.

5. A coating compound consisting of a base or body composed of common glue, sulphureted water or sulphur in solution, paris-white and zinc-white, and shellac and alcohol, compounded substantially as and for the purpose set forth.

6. A coating compound consisting of a base or body composed of common glue, sulphur, paris-white, and zinc-white, in combination with coloring-matter, whereby the color of the body mixture may be varied or changed, all compounded as described, and for the purpose set forth.

7. A coating compound consisting of a base or body composed of common glue, sulphureted water or sulphur in solution, paris-white, and zinc-white, in combination with coloring-matter, whereby the color of the body mixture may be varied or changed, all compounded as described, and for the purpose set forth.

8. A coating compound consisting of a base or body composed of common glue, sulphur, paris-white, zinc-white, and shellac, in combination with coloring-matter, whereby the color of the body mixture may be varied or changed, all compounded as described, and for the purpose set forth.

9. A coating compound consisting of a base or body composed of common glue, sulphur, paris-white, zinc-white, shellac, and alcohol, in combination with coloring-matter, whereby the color of the body mixture may be varied or changed, all compounded as described, and for the purpose set forth.

JOHN F. MARTIN.

Witnesses:
W. W. ELLIOTT,
WILL R. OMOHUNDRO.